(12) United States Patent
Zielinski et al.

(10) Patent No.: US 9,886,585 B2
(45) Date of Patent: Feb. 6, 2018

(54) MULTI-LAYER DATA SECURITY

(71) Applicant: SAP SE, Walldorf (DE)

(72) Inventors: Marek Piotr Zielinski, Pretoria (ZA); Jan Harm Petrus Eloff, Pretoria (ZA)

(73) Assignee: SAP SE, Walldorf (DE)

( * ) Notice: Subject to any disclaimer, the term of this patent is extended or adjusted under 35 U.S.C. 154(b) by 29 days.

(21) Appl. No.: 13/918,234

(22) Filed: Jun. 14, 2013

(65) Prior Publication Data
US 2014/0372768 A1 Dec. 18, 2014

(51) Int. Cl.
G06F 21/60 (2013.01)
G06F 21/62 (2013.01)

(52) U.S. Cl.
CPC ........... *G06F 21/602* (2013.01); *G06F 21/60* (2013.01); *G06F 21/62* (2013.01); *G06F 21/6209* (2013.01); *G06F 2221/2107* (2013.01); *G06F 2221/2111* (2013.01); *G06F 2221/2113* (2013.01); *G06F 2221/2137* (2013.01)

(58) Field of Classification Search
CPC ............. G06F 21/60; G06F 21/62; H04L 9/08
See application file for complete search history.

(56) References Cited

U.S. PATENT DOCUMENTS

| | | | |
|---|---|---|---|
| 5,584,022 A | 12/1996 | Kikuchi et al. | |
| 5,699,428 A | 12/1997 | McDonnal et al. | |
| 6,185,681 B1 | 2/2001 | Zizzi | |
| 6,981,141 B1 | 12/2005 | Mahne et al. | |
| 7,395,436 B1 | 7/2008 | Nemovicher | |
| 7,734,601 B2 | 6/2010 | Weber et al. | |
| 7,818,585 B2 | 10/2010 | Kilian-Kehr | |
| 8,135,655 B2 | 3/2012 | Oaten et al. | |
| RE43,906 E | 1/2013 | Garcia | |
| 8,555,403 B1 * | 10/2013 | Kilday | G06F 21/62 709/229 |
| 8,763,095 B2 | 6/2014 | Buehl | |
| 8,769,605 B2 | 7/2014 | Kaufmann et al. | |
| 8,788,803 B2 | 7/2014 | Irvine | |
| 2003/0217264 A1 | 11/2003 | Martin et al. | |
| 2004/0049482 A1 | 3/2004 | Brechter et al. | |
| 2005/0049882 A1 | 3/2005 | Sawka | |
| 2005/0132070 A1 | 6/2005 | Redlich et al. | |
| 2007/0050362 A1 * | 3/2007 | Low | G06F 21/6245 |

(Continued)

OTHER PUBLICATIONS

European Search Report issued in EP 14 001 997.7, dated Nov. 24, 2014.

*Primary Examiner* — Carl Colin
*Assistant Examiner* — Vance Little
(74) *Attorney, Agent, or Firm* — Jones Day

(57) ABSTRACT

Data may be encrypted using a public key. From a plurality of functions executable on the data, one or more functions may be selected. The selected one or more functions may be associated with the encrypted data. The selected one or more functions may provide exclusive access to the data. A data structure specifying conditions for access to the one or more functions may be created. An exclusive interface to provide access to the one or more functions may be created. The interface, upon determining that one or more conditions from the conditions are satisfied, may grant access to the one or more functions. The encrypted data, the associated one or more functions, the data structure, and the interface may be included into an object.

18 Claims, 5 Drawing Sheets

(56) References Cited

U.S. PATENT DOCUMENTS

| | | | |
|---|---|---|---|
| 2008/0109913 A1* | 5/2008 | Sturtevant | G06F 21/606 726/32 |
| 2011/0126293 A1* | 5/2011 | Berengoltz | G06F 21/62 726/26 |
| 2013/0145178 A1* | 6/2013 | Jeffries | G06F 21/6209 713/193 |
| 2013/0177156 A1* | 7/2013 | Ryan | H04L 9/08 380/277 |

* cited by examiner

100

200

300

| Function | Parameter | Parameter Value |
|---|---|---|
| A | Max Access | 4 |
| B | Authorized Location | Latitude = x; Longitude = y |
| A | Restricted User | User N |
| A | Authorized Time Period | Jan 5, 2013 - Feb 14, 2015 |
| . | | |
| . | | |
| . | | |
| X | | |

MULTI-LAYER DATA SECURITY

BACKGROUND

Organizations often collaborate and share information to develop products and/or services. In certain circumstances, however, the information that needs to be shared may be confidential (e.g., intellectual property). Consequently, organizations may be reluctant to share the confidential information without certainty that the confidential information will not be misused. Although conventional data security technologies, such as passwords and digital rights management, provide some data protection, these technologies may be circumvented. For example, password-protected data may be copied and distributed after the initial extraction of the original data.

BRIEF DESCRIPTION OF THE DRAWINGS

FIG. 4 illustrates a data structure which stores the criteria used by a self-aware access control component (SAACC) to determine authorized usage of functions associated with a SADO according to an embodiment.

DETAILED DESCRIPTION

Embodiments may be discussed in systems to create and use secure data objects. In an embodiment, data may be encrypted using a key. From a plurality of functions executable on the data, one or more functions may be selected. The selected one or more functions may be associated with the encrypted data. The selected one or more functions may provide exclusive access to the data. A data structure specifying conditions for access to the one or more functions may be created. An exclusive interface to provide access to the one or more functions may be created. The interface, upon determining that one or more conditions from the conditions are satisfied, may grant access to the one or more functions. In another embodiment, the interface, upon determining that all conditions are satisfied, may grant access to the one or more functions. The encrypted data, the associated one or more functions, the data structure, and the interface may be included into an object.

In an embodiment, software necessary to execute the one or more functions may be included in the object. In an embodiment, the one or more conditions may specify an authorized user with access to the one or more functions. In an embodiment, the one or more conditions may specify a time period for accessing the one or more functions. In an embodiment, the one or more conditions may specify a maximum number of times that the one or more functions can be executed. In an embodiment, the interface may grant access to the one or more functions upon determining that all the conditions are satisfied.

Organizations often collaborate and share information to develop products and/or services. In certain circumstances, however, the information which needs to be shared may be confidential (e.g., intellectual property). Consequently, organizations may be reluctant to share the confidential information without certainty that the confidential information will not be misused. Although conventional data security technologies, such as passwords and digital rights management, provide some data protection, these technologies may be circumvented. For example, password-protected data may be copied and distributed after the initial authorized extraction of the original data.

Figure 1:
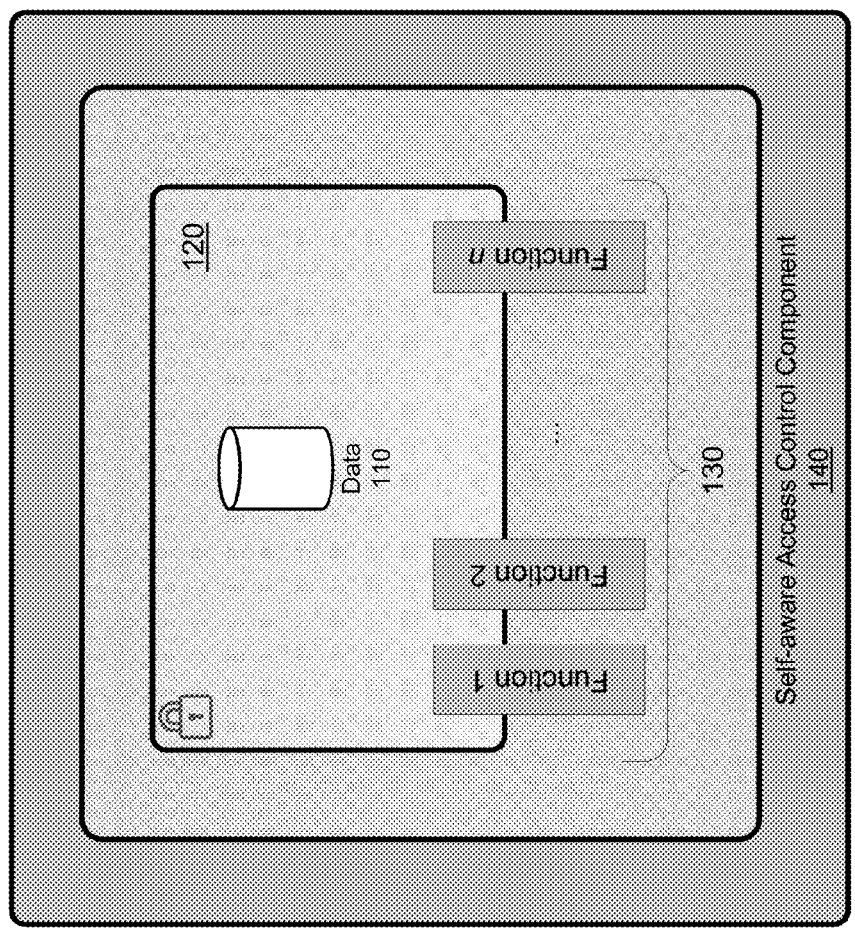
FIG. 1 illustrates a self-aware data object (SADO) according to an embodiment.

The problems presented by conventional data security technologies may be addressed by creating and using objects with multiple layers of security that encapsulate the objects (self-aware data objects). FIG. 1 illustrates a self-aware data object (SADO) 100 according to an embodiment. Data 110 is confidential data which needs to be protected based on the context in which the data is utilized. Data 110 may be protected by data encryption layer 120. Data access functions 130 may provide different types of access to data 110. Self-aware access control component (SAACC) 140 is an exclusive interface through which data 110 may be accessed. Specifically, SAACC exclusively controls access to the functions 130.

Data 110 may be encrypted to create encryption layer 120. Encryption layer 120 may prevent unauthorized access to data 110. Even if the data 110 is extracted from the SADO 100 in an unauthorized way, the encryption layer 120 may ensure that the data 110 is not usable. A symmetric or an asymmetric encryption scheme may be used for this purpose. Examples of symmetric encryption schemes include Twofish, Serpent, AES, Blowfish, CAST5, RC4, 3DES, and IDEA. Examples of asymmetric encryption schemes include Pretty Good Privacy (PGP), Transport Layer Security (TLS), and GNU Privacy Guard (GPG). In a symmetric encryption scheme, the same key is used to encrypt and decrypt data 110. In contrast, in an asymmetric scheme, different keys are used to encrypt and decrypt data 110. Specifically, in an asymmetric scheme, the data 110 is encrypted with a public key of an authorized data user. The public key may be made known to any user/system that needs to send sensitive data to the authorized data user. The data 110 may only be decrypted by the authorized data user's private key known exclusively by the authorized data user.

Data-manipulation functions 130 are functions through which data 110 may be utilized. These functions 130 may be provided at the point of creation of the SADO 100. Functions 130 may be the only way for an authorized user to access data 110. That is, the data 110 cannot be used without invoking one or more of the functions 130. This ensures that the data 110 can only be accessed in predetermined authorized manners specified by the functions 130. In an embodiment, software necessary to execute functions 130 may be included in SADO 100. The software may be included in SADO 100 at the point in time when the SADO 100 is created.

SAACC 140 is the only interface through which the SADO 100 may be accessed. SAACC 140 allows selective access to one more functions 130 by checking the context in which the functions are invoked. The SAACC 140 may determine: 1) the purpose (or function) for which the data is used, 2) the user (or process) invoking a function 130 to access the data 110, 3) the environment in which a function 130 is invoked, 4) the time period during which a function 130 is invoked, 5) the number of times a function 130 is invoked, and/or 6) any conflicts of interest which arise when a function 130 is invoked.

Figure 2:
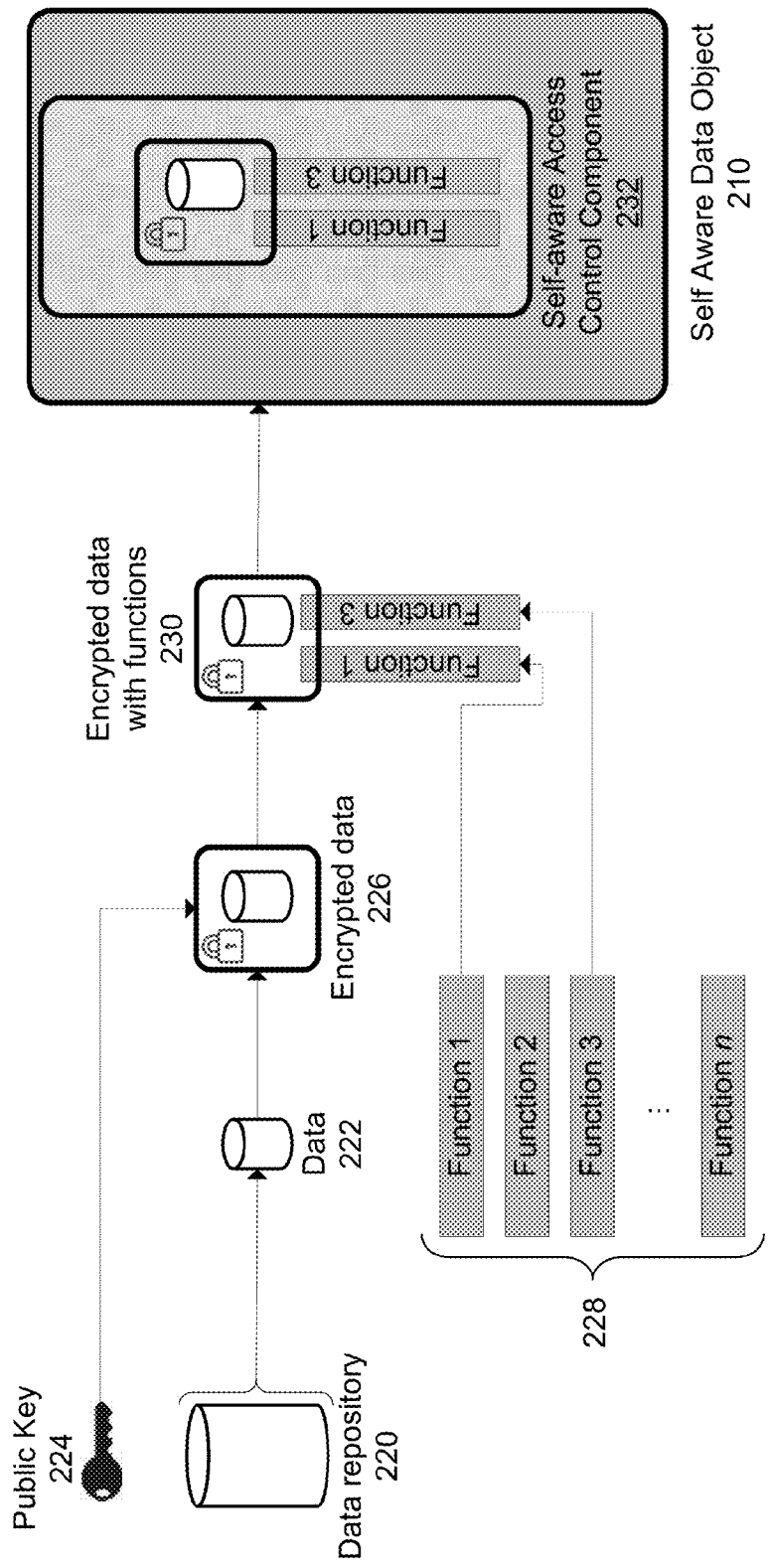
FIG. 2 illustrates a process diagram to create a SADO according to an embodiment.

FIG. 2 illustrates a process diagram 200 to create a SADO 210 according to an embodiment. Data may be retrieved from a data repository 220. The public key associated with an intended authorized user may be utilized to encrypt data 222 to create encrypted data 226. A set of functions 228 which may be performed on data 222 may be available. From this set 228, a subset of functions may be selected and associated with the encrypted data 226 to create encrypted data with associated functions 230. For example, from a set of functions 1 to N (228), functions 1 and 3 may be associated with encrypted data 226. Consequently, the encrypted data with associated functions 230 may only be accessed via function 1 and/or function 3. The encrypted data with associated functions 230 may be encapsulated by an interface, SAACC 232, to create the SADO 210. SAACC 232 may be the only interface through which the SADO 210 may be accessed. SAACC 232 may allow selective access to data 222 through function 1 and/or function 3 by checking the context in which the functions are invoked as explained above. The created SADO 210 may be distributed to the intended authorized user/process.

Figure 3:
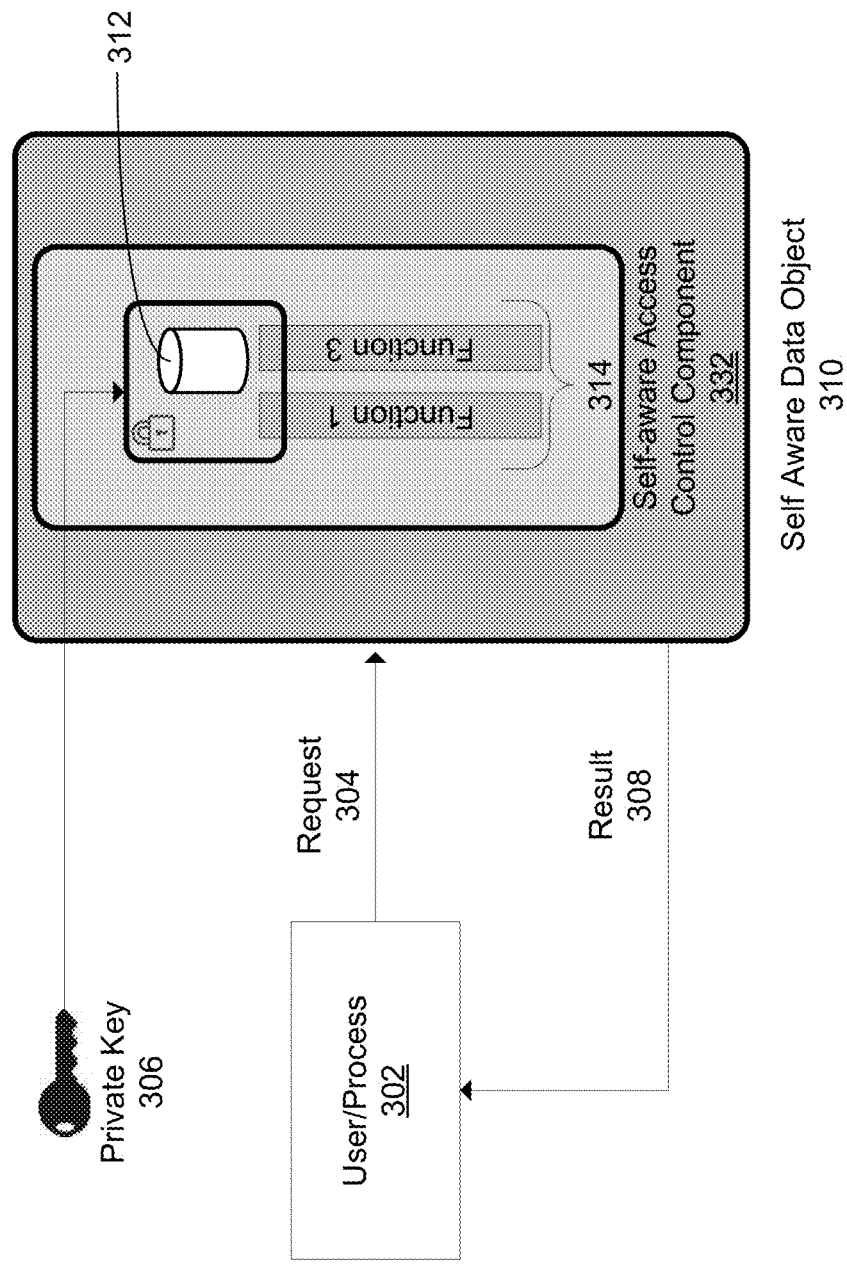
FIG. 3 illustrates a process diagram illustrating the usage of a SADO according to an embodiment.

FIG. 3 illustrates a process diagram 300 illustrating the usage of a SADO 310 according to an embodiment. The SADO 310 may be created through a process similar to the process 200 discussed above. A user/process 302 may perform a task which requires the data 312 within SADO 310. To access the data, a request 304 may be sent to the SADO 310 to use a specific function, for example, function 3, from the set of functions 314 associated with the SADO 310. The request 304 may be received by the SAACC 332. The SAACC 332 may determine the context of the intended data use and determine whether the data use satisfies criteria for authorized use as specified during the creation of SADO 310. That is, The SAACC 332 may determine: 1) the purpose (or function) for which the data 312 is used, 2) the user (or process) invoking function 3 to access the data 312, 3) the environment in which function 3 is invoked, 4) the time period during which function 3 is invoked, 5) the number of times function 3 is invoked, and/or 6) any conflicts of interest which arise when function 3 is invoked (e.g., conflicts of interest between the owner of the data object and the consumer of the data object). If the request does not satisfy one or more parameters from the criteria, access to the requested function may be denied. If the request satisfies the criteria, the SAACC 332 may allow access to the requested function and function 3 may begin execution. Responsive to the execution of function 3, one or more state variables within SADO 310 may be updated. The state variables may keep track of, for example, the number of times the data 312 has been accessed, the number of times each function 314 has been executed, the locations at which each function 314 has been executed, the users that executed each function 314, etc. The user's private key 306 may be provided to the SADO 310 in order to decrypt data 312 during the execution of function 3. In an embodiment the private key 306 may be provided along with request 304. The result 308 of the executed function may be returned to the user/process 302.

FIG. 4 illustrates a data structure 400 which stores the criteria used by an SAACC to determine authorized usage of functions associated with a SADO according to an embodiment. In an embodiment, the data structure 400 may be created and included in the respective SADO. In an embodiment, the data structure may store conditions 408-414 which need to be met for an SAACC to grant access to the respective functions. Each condition may specify a function 402, parameters of the authorization criteria 404, and respective parameter values 406. For example, condition 408 within data structure 400 specifies that function A may be executed a maximum of four times. Condition 410 specifies that function B may be executed when the device requesting the function is in a particular physical location. Condition 412 specifies that user N may not execute function A. Condition 414 specifies that function A may be executed from Jan. 5, 2013 to Feb. 14, 2015.

In an embodiment, for an SAACC to grant access to a function such as function A, all conditions associated with function A (408, 412, and 414) need to be met. In an alternate embodiment, for an SAACC to grant access to a function such as function A, a certain predetermined subset of conditions need to be met (e.g., at least 408 and 414 need to be met). This information may be included in the data structure 400. In an embodiment, any software necessary to evaluate the conditions defined in data structure 400 may be included in the associated SADO at the point in time when the SADO is created. For example, to evaluate condition 410, global positioning system (GPS) capable software may be bundled with the SADO.

The conditions shown in FIG. 4 and the format of the conditions are illustrative and are not meant to restrict the scope of the invention. In other embodiments, different conditions may be defined via data structure 400 depending on the context. Similarly, the information in data structure 400 may be stored in multiple data structures and may be normalized or denormalized as necessary.

Returning to FIG. 2, in an exemplary embodiment, a user/process may create a SADO encapsulating an electronic document file 222 such as, for example, a Microsoft Word™, Microsoft Excel™, or Adobe PDF™ file. The file 222 may be retrieved from a data repository 220 such as a database or a hard drive. The public key associated with an intended authorized user of the file 222 may be utilized to encrypt the file 222 to create encrypted file 226. A set of functions 228 which may be performed on file 222 may be available. For example, the set of functions 228 may be "print," "view," "edit," and "copy." From this set 228, a subset of functions may be selected and associated with the encrypted data 226 to create encrypted data with associated functions 230. For example, the functions—print and view—may be associated with the encrypted file 226. Consequently, the contents of the encrypted file may only be printed or viewed. The encrypted file with associated functions 230 may be encapsulated by the SAACC 232 to create the SADO 210. SAACC 232 may be the only interface through which the SADO 210 may be accessed. SAACC 232 may allow selective access to data 222 through print and/or view functions by checking the context in which the functions are invoked. Any software necessary to execute the associated functions may be included in the SADO 210. For example, any software necessary to print or view the data 222 may be included in the SADO 210.

The criteria which specify the context in which the print and view functions may be invoked may be defined in a data structure (e.g., data structure 400) and the data structure may be included in SADO 210 at the point of creation of SADO 210. Continuing with the above exemplary embodiment, the data structure 400 corresponding to the SADO 210 may include the following criteria: 1) the view function may be executed if the device executing the function is located in a particular office building, 2) the view function may be executed if the user viewing the file is associated with a particular user identifier, and 3) the print function may be executed if the printer is connected to a particular local area network. Any software necessary to determine the above conditions may be included in the SADO 210. The created SADO 210 may then be distributed to the intended authorized user/process.

Continuing with the above example and turning to FIG. 3, SADO 310 may be SADO 210 created through the process 200 discussed above. A user/process 302 may perform a task which requires the file 312 (i.e., the electronic document file 222 described above) within SADO 310. For example, a user 302 may want to read the contents of file 312. To access the file 312, a request 304 may be sent to the SADO 310 to use the view function from the set of functions 314 associated with the SADO 310. The request 304 may be received by the SAACC 332. The SAACC 332 may determine the context of the intended data use and determine whether the data use satisfies the criteria for authorized use as specified during the creation of SADO 310. That is, the SAACC 332 may determine if the condition specified in the data structure 400 are met. Specifically, in this example, the SAACC 332 may check if: 1) the device (e.g., computer) executing the view function is located in a particular office building, and 2) if the user viewing the file is associated with a particular user identifier. To check if the device is in the particular office building, the SAACC 332 may utilize software included in the SADO 332 such as software with GPS capabilities. The GPS software may determine the location of the device and pass this location information to the SAACC 332. Other methods are known in the art for determining the location of the device including determining distance of the device from a Wi-Fi transmitter/receiver or a cellular tower. The SAACC 332 may then check if the obtained location is within the particular office building. Similarly, the SADO 310 may include software to determine the identifier of the user executing the view function.

If the request does not satisfy one or more parameters from the criteria specified in the data structure 400, access to the view function may be denied. That is, in an embodiment, if the request satisfies all parameters from the criteria specified in the data structure 400, access to the view function may be granted. For example, if the device is not located within the office building, access to the view function may be denied. If the request satisfies the criteria, the SAACC 332 may allow access to the view function and the function may begin execution. Responsive to the execution of the view function, one or more state variables within SADO 310 may be updated. The state variables may keep track of, for example, the number of times the data 312 has been accessed, the number of times the view function has been executed, the locations at which the view function has been executed, the users that executed the view function, etc. The user's private key 306 may be provided to the SADO 310 in order to decrypt data 312 during the execution of the view function. In an embodiment, the private key 306 may be provided along with request 304. The result 308 of the executed function may be returned to the user/process 302. In an embodiment, the SADO 310 may include the software necessary to execute the view function. For example, if the file 312 is a Microsoft Word™ file, the SADO 310 may include a Microsoft Word™ file viewer to view the file 312.

Returning to FIG. 2, in another exemplary embodiment, a user/process may create a SADO encapsulating an electronic media file 222 such as, for example, an audio file or a video file. The file 222 may be retrieved from a data repository 220 such as a database or a hard drive. The public key associated with an intended authorized user of the file 222 may be utilized to encrypt the file 222 to create encrypted file 226. A set of functions 228 which may be performed on file 222 may be available. For example, the set of functions 228 may be "play," "edit," "play section 1," and "edit audio." Certain functions may be more granular versions of other functions. The "play" function may enable playback of the entire file 222. However, the "play section 1" function may only enable playback of a particular section the file 222. Similarly, the "edit" function may enable editing of both audio and video streams of file 222. However, the "edit audio" function may only enable editing of the audio stream of file 222. From this set 228, a subset of functions may be selected and associated with the encrypted data 226 to create encrypted data with associated functions 230. For example, the functions—play and edit—may be associated with the encrypted file 226. Consequently, the contents of the encrypted file may only be played or edited. The encrypted file with associated functions 230 may be encapsulated by the SAACC 232 to create the SADO 210. SAACC 232 may be the only interface through which the SADO 210 may be accessed. SAACC 232 may allow selective access to data 222 through the play and/or edit functions by checking the context in which the functions are invoked. Any software necessary to perform the associated functions may be included in the SADO 210. For example, the software necessary to play or edit the data 222 may be included in the SADO 210.

The criteria which specifies the context in which the play and edit functions may be invoked may be defined in a data structure (e.g., data structure 400) and the data structure may be included in SADO 210 at the point of creation of SADO 210. Continuing with the above exemplary embodiment, the data structure 400 corresponding to the SADO 210 may include the following criteria: 1) the play function may be executed if the manufacturer of the device playing the file and the creator of the file are the same company (an example of conflict of interest checking), 2) the play function may be executed if the number of prior executions of the play function by a particular user has not exceeded a predetermined threshold, 3) the edit function may be executed within a particular time period, for example, between Jan. 14, 2013 and Feb. 14, 2013. Any software necessary to determine the above conditions may be included in the SADO 210. The created SADO 210 may then be distributed to the intended authorized user/process.

Continuing with the above example and turning to FIG. 3, SADO 310 may be SADO 210 created through the process 200 discussed above. A user/process 302 may perform a task which requires the file 312 (i.e., the media file 222 described above) within SADO 310. For example, a user 302 may want to play the file 312. To access the file 312, a request 304 may be sent to the SADO 310 to use the play function from the set of functions 314 associated with the SADO 310. The request 304 may be received by the SAACC 332. The SAACC 332 may determine the context of the intended data use and determine whether the data use satisfies the criteria for authorized use as specified during the creation of SADO 310. That is, the SAACC 332 may determine if the conditions specified in the data structure 400 are met. Specifically, in this example, the SAACC 332 may check: 1) if the manufacturer of the device executing the play function is the same as the creator of file 312, and 2) if the number of prior executions of the play function by the user 302 has not exceeded a predetermined threshold. To check the above conditions, the SAACC 332 may utilize software included in the SADO 332 such as software capable of reading firmware information of the device (e.g., to retrieve the manufacturer of the device).

If the request does not satisfy one or more parameters from the criteria specified in the data structure 400, access to the play function may be denied. For example, if the number of prior executions of the play function by the user 302 has exceeded the predetermined threshold, access to the play function may be denied. If the request satisfies the criteria, the SAACC 332 may allow access to the play function and the function may begin execution. Responsive to the execution of the play function, one or more state variables within SADO 310 may be updated. The state variables may keep track of, for example, the number of times the file 312 has been accessed, the number of times the play function has been executed by a particular user, the locations at which the play function has been executed, the users that executed the play function, etc. The user's private key 306 may be provided to the SADO 310 in order to decrypt file 312 during the execution of the play function. In an embodiment the private key 306 may be provided along with request 304. The result 308 of the executed function may be returned to the user/process 302. In an embodiment, the SADO 310 may include the software necessary to execute the play function. For example, if the file 312 is a video file, the SADO 310 may include a video player application with the necessary codecs to play the file 312.

The above examples are illustrative and are not meant to restrict the scope of the invention. For instance, although the above examples discuss creating SADOs from electronic document files and media files, in other embodiments, SADOs may be created from any type of data including any type of file or application. Similarly, the functions associated with SADOs may vary depending on the file, application, and/or usage. In an embodiment, functions may receive input parameters provided by a user/process. In an embodiment, multiple files and/or applications may be packaged into a single SADO.

Although many of the embodiments above are discussed in the context of asymmetric encryption, symmetric encryption may be utilized in other similar embodiments. Specifically, in the embodiments described above, instead of using a public key and a private key during the encryption and decryption respectively (asymmetric encryption), a single key may be used for both encryption and decryption (symmetric encryption).

Figure 5:
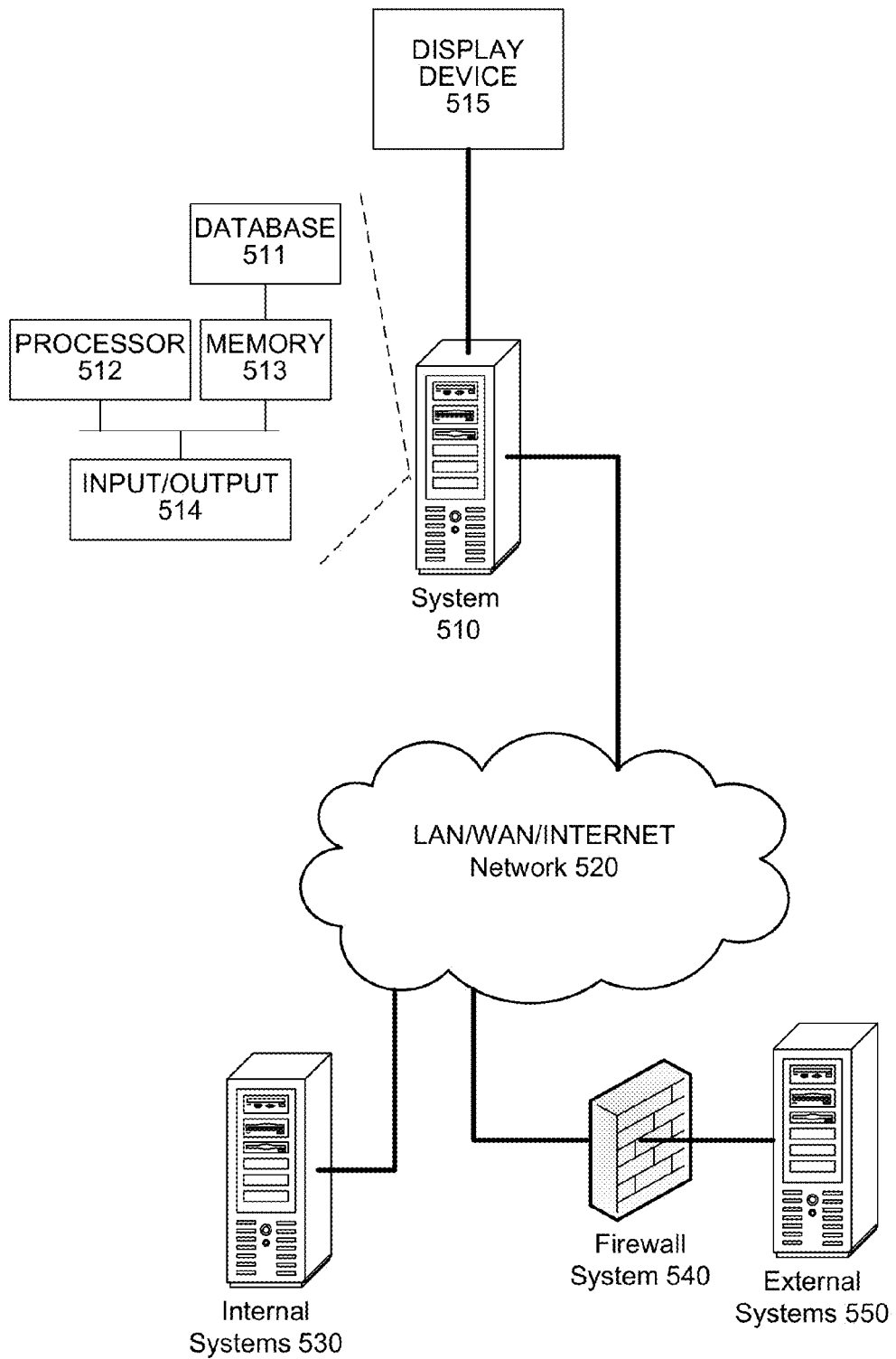
FIG. 5 shows an exemplary architecture in an embodiment.

FIG. 5 shows an exemplary architecture in an embodiment of the invention. The system 510 to create and/or access SADOs as explained above may be coupled to a display device 515, existing internal systems 530 through a network 520 and to external systems 550 through the network 520 and firewall system 540. The system 510 may include a desktop computer, laptop computer, tablet PC, client computer, mobile phone, central computer in a vehicle, any device with a touch screen, and any other computer. The display device 515 may include a computer monitor, a touch screen, a tablet PC screen, a mobile phone screen, and any other displays. The existing internal systems 530 may include a server and may provide business data and/or other data necessary for the creation and/or access of SADOs. The external systems 550 may include a server and may be maintained by a third party, such as an information service provider, and may contain business data and/or other data necessary for the creation and/or access of SADOs, that may be updated by the third party on a periodic basis. The system 510 may interact with these external systems to obtain updates through a firewall system 540 separating the internal systems from the external systems.

While internal systems 530 and external systems 550 are included in FIG. 5, in some embodiments, one or both of these systems may not be required. In an embodiment, the functionality provided by the internal systems 530 and external systems 550 may be provided by the system 510.

Each of the systems in FIG. 5 may contain a processing device 512, memory 513, a database 511, and an input/ output interface 514, all of which may be interconnected via a system bus. In various embodiments, each of the systems 510, 530, 540, and 550 may have an architecture with modular hardware and/or software systems that include additional and/or different systems communicating through one or more networks. The modular design may enable a business to add, exchange, and upgrade systems, including using systems from different vendors in some embodiments. Because of the highly customized nature of these systems, different embodiments may have different types, quantities, and configurations of systems depending on the environment and organizational demands.

In an embodiment, memory 513 may include different components for retrieving, presenting, changing, and saving data. Memory 513 may include a variety of memory devices, for example, Dynamic Random Access Memory (DRAM), Static RAM (SRAM), flash memory, cache memory, and other memory devices. Additionally, for example, memory 513 and processing device(s) 512 may be distributed across several different computers that collectively comprise a system.

Database 511 may include any type of data storage adapted to searching and retrieval. The database 511 may include SAP database (SAP DB), Informix, Oracle, DB2, Sybase, and other such database systems. The database 511 may include SAP's HANA (high performance analytic appliance) in-memory computing engine and other such in-memory databases.

Processing device 512 may perform computation and control functions of a system and comprises a suitable central processing unit (CPU). Processing device 512 may comprise a single integrated circuit, such as a microprocessing device, or may comprise any suitable number of integrated circuit devices and/or circuit boards working in cooperation to accomplish the functions of a processing device. Processing device 512 may execute computer programs, such as object-oriented computer programs, within memory 513.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, some of the described embodiments may include software and hardware, but some systems and methods consistent with the present invention may be implemented in software or hardware alone. Additionally, although aspects of the present invention are described as being stored in memory, this may include other computer readable media, such as secondary storage devices, for example, solid state drives, or DVD ROM; the Internet or other propagation medium; or other forms of RAM or ROM.

We claim:

1. A computer-implemented method comprising: encrypting, by a computer processor, data using a key; from a plurality of functions executable on the data, selecting at least one function; associating the selected at least one function with the encrypted data, wherein the selected at least one function provides exclusive access to the data, and wherein the selected at least one function is executable only on the data; creating a data structure specifying conditions for access to the at least one function with the encrypted data; creating an exclusive interface to provide access to the at least one function, wherein, upon determining that at least one condition from the conditions is satisfied, grants access to the at least one function, and wherein the interface, upon determining that no conditions are satisfied, denies access to the at least one function, wherein the determining comprises checking a context in which the at least one function is being invoked by based on at least one of: (i) a computing environment in which the at least one function is invoked, (ii) a number of times the at least one function is invoked, and (iii) whether any conflicts of interest arise between an owner of the data structure and a consumer of the data structure when the at least one function is invoked; and including the encrypted data, the associated at least one function, software necessary to execute the at least one function, the data structure, and the interface into an object; wherein executable software necessary to determine whether the conditions are satisfied is included in the object, wherein the software necessary to determine whether the conditions are satisfied is only accessible by the interface.

2. The method of claim 1, wherein the at least one condition specifies an authorized user with access to the at least one function.

3. The method of claim 1, wherein the at least one condition specifies a time period for accessing the at least one function.

4. The method of claim 1, wherein the at least one condition specifies a maximum number of times that the at least one function can be executed.

5. The method of claim 1, wherein the at least one condition specifies a conflict of interest arising from execution of the at least one function.

6. The method of claim 1, wherein the interface grants access to the at least one function upon determining that all the conditions are satisfied.

7. An apparatus comprising: a computer processing device to: encrypt data using a key; from a plurality of functions executable on the data, select at least one function; associate the selected at least one function with the encrypted data, wherein the selected at least one function provides exclusive access to the data, and wherein the selected at least one function is executable only on the data; create a data structure specifying conditions for access to the at least one function with the encrypted data; create an exclusive interface to provide access to the at least one function, wherein, upon determining that at least one condition from the conditions is satisfied, grants access to the at least one function, and wherein the interface, upon determining that no conditions are satisfied, denies access to the at least one function, wherein the determining comprises checking a context in which the at least one function is being invoked by based on at least one of: (i) a computing environment in which the at least one function is invoked, (ii) a number of times the at least one function is invoked, and (iii) whether any conflicts of interest arise between an owner of the data structure and a consumer of the data structure when the at least one function is invoked; and include the encrypted data, the associated at least one function, software necessary to execute the at least one function, the data structure, and the interface into an object; wherein executable software necessary to determine whether the conditions are satisfied is included in the object, wherein the software necessary to determine whether the conditions are satisfied is only accessible by the interface.

8. The apparatus of claim 7, wherein the at least one condition specifies an authorized user with access to the at least one function.

9. The apparatus of claim 7, wherein the at least one condition specifies a time period for accessing the at least one function.

10. The apparatus of claim 7, wherein the at least one condition specifies a maximum number of times that the at least one function can be executed.

11. The apparatus of claim 7, wherein the at least one condition specifies any conflicts of interest arising from execution of the at least one function.

12. The apparatus of claim 7, wherein the interface grants access to the at least one function upon determining that all the conditions are satisfied.

13. A non-transitory computer-readable medium embodied with computer-executable instructions for causing a computer to execute instructions, the computer instructions comprising: encrypting, by a computer processor, data using a key; from a plurality of functions executable on the data, selecting at least one function; associating the selected at least one function with the encrypted data, wherein the selected at least one function provides exclusive access to the data, and wherein the selected at least one function is executable only on the data; creating a data structure specifying conditions for access to the at least one function with the encrypted data; creating an exclusive interface to provide access to the at least one function, wherein, upon determining that at least one condition from the conditions is satisfied, grants access to the at least one function, and wherein the interface, upon determining that no conditions are satisfied, denies access to the at least one function, wherein the determining comprises checking a context in which the at least one function is being invoked by based on: (i) a computing environment in which the at least one function is invoked, (ii) a number of times the at least one function is invoked, and (iii) whether any conflicts of interest arise between an owner of the data structure and a consumer of the data structure when the at least one function is invoked; and including the encrypted data, the associated at least one function, software necessary to execute the at least one function, the data structure, and the interface into an object; wherein executable software necessary to determine whether the conditions are satisfied is included in the object, wherein the software necessary to determine whether the conditions are satisfied is only accessible by the interface.

14. The computer-readable medium of claim 13, wherein the at least one condition specifies an authorized user with access to the at least one function.

15. The computer-readable medium of claim 13, wherein the at least one condition specifies a time period for accessing the at least one function.

16. The computer-readable medium of claim 13, wherein the at least one condition specifies a maximum number of times that the at least one function can be executed.

17. The computer-readable medium of claim 13, wherein the at least one condition specifies any conflicts of interest arising from execution of the at least one function.

18. The computer-readable medium of claim 13, wherein the interface grants access to the at least one function upon determining that all the conditions are satisfied.

* * * * *